United States Patent
Tai et al.

(10) Patent No.: US 12,465,753 B2
(45) Date of Patent: Nov. 11, 2025

(54) IMPLANTABLE DEVICE, ENCAPSULATING METHOD AND CEREBRAL CORTEX STIMULATION-BASED VISUAL PROSTHESIS

(71) Applicant: INTELLIMICRO MEDICAL CO., LTD., Changsha (CN)

(72) Inventors: Yu-Chong Tai, Changsha (CN); Changlin Pang, Changsha (CN)

(73) Assignee: INTELLIMICRO MEDICAL CO., LTD., Changsha (CN)

( * ) Notice: Subject to any disclaimer, the term of this patent is extended or adjusted under 35 U.S.C. 154(b) by 538 days.

(21) Appl. No.: 17/931,015

(22) Filed: Sep. 9, 2022

(65) Prior Publication Data
US 2023/0001186 A1 Jan. 5, 2023

Related U.S. Application Data

(63) Continuation of application No. PCT/CN2021/079308, filed on Mar. 5, 2021.

(30) Foreign Application Priority Data

Mar. 11, 2020 (CN) .......................... 202010166219.4

(51) Int. Cl.
*A61N 1/05* (2006.01)
*A61N 1/36* (2006.01)

(52) U.S. Cl.
CPC ......... *A61N 1/0531* (2013.01); *A61N 1/3606* (2013.01)

(58) Field of Classification Search
None
See application file for complete search history.

(56) References Cited

U.S. PATENT DOCUMENTS

| | | | |
|---|---|---|---|
| 8,122,596 B2 | 2/2012 | Krulevitch et al. |
| 9,192,767 B2 | 11/2015 | Mercanzini et al. |
| 2003/0158588 A1 | 8/2003 | Rizzo et al. |
| 2010/0211168 A1 | 8/2010 | Goertz et al. |

(Continued)

FOREIGN PATENT DOCUMENTS

| | | |
|---|---|---|
| CN | 102815664 A | 12/2012 |
| CN | 104340956 A | 2/2015 |

(Continued)

OTHER PUBLICATIONS

Extended European Search Report from corresponding Application No. 21766941.5 issued Jul. 18, 2023. (6 pages).

(Continued)

*Primary Examiner* — Michael W Kahelin
(74) *Attorney, Agent, or Firm* — Grossman, Tucker, Perreault & Pfleger PLLC

(57) ABSTRACT

An implantable device includes a flexible cable, a circuit chip, a fluid adhesion layer, and a vapor deposited layer. The flexible cable includes a lead-in part, a stimulation part and a connection part connected between the lead-in part and the stimulation part. The circuit chip is fixed to a surface of one side of the lead-in part, and is electrically connected to the lead-in part. The fluid adhesion layer is adhered to an outer side of the circuit chip and an outer side of the lead-in part. The vapor deposited layer (4) is directly deposited on an outer side of the fluid adhesion layer.

14 Claims, 7 Drawing Sheets

(56) References Cited

U.S. PATENT DOCUMENTS

| | | | |
|---|---|---|---|
| 2011/0054579 A1 | 3/2011 | Kumar et al. | |
| 2014/0222103 A1 | 8/2014 | Lauritzen et al. | |
| 2015/0366302 A1 | 12/2015 | Vaillancourt et al. | |
| 2017/0252555 A1 | 9/2017 | Greenberg et al. | |
| 2018/0333571 A1* | 11/2018 | Pepin .................. | A61N 1/0556 |
| 2020/0022601 A1 | 1/2020 | Rogers et al. | |

FOREIGN PATENT DOCUMENTS

| | | |
|---|---|---|
| CN | 105324101 A | 2/2016 |
| CN | 106456966 A | 2/2017 |
| CN | 109621195 A | 4/2019 |
| CN | 109626319 A | 4/2019 |
| CN | 109641128 A | 4/2019 |
| CN | 109821149 A | 5/2019 |
| CN | 110010766 A | 7/2019 |
| CN | 111330155 A1 | 6/2020 |
| IN | 105709331 A | 6/2016 |
| IN | 209993588 U | 1/2020 |
| WO | 2015172894 A1 | 11/2015 |
| WO | 2019081683 A1 | 5/2019 |

OTHER PUBLICATIONS

First Office Action and Chinese search report from corresponding Chinese Application No. 202010166219.4, dated Aug. 12, 2020. English translation attached.

International Search Report from corresponding International Application No. PCT/CN2021/079308, dated Jun. 3, 2021. English translation attached.

Written Opinion from corresponding International Application No. PCT/CN2021/079308, dated Jun. 3, 2021. English translation attached.

\* cited by examiner

IMPLANTABLE DEVICE, ENCAPSULATING METHOD AND CEREBRAL CORTEX STIMULATION-BASED VISUAL PROSTHESIS

CROSS REFERENCE OF RELATED APPLICATION

The present application is a continuation of International Application No. PCT/CN2021/079308, filed on Mar. 5, 2021, which claims the priority of the Chinese Patent Application No. 202010166219.4 which is entitled "IMPLANTABLE DEVICE, ENCAPSULATING METHOD AND CEREBRAL CORTEX STIMULATION-BASED VISUAL PROSTHESIS" and filed on Mar. 11, 2020, both of which are hereby incorporated by reference in their entireties.

TECHNICAL FIELD

The present disclosure relates to the technical field of neurostimulators, and more particularly, to an implantable device, its encapsulating method and a cerebral cortex stimulation-based visual prosthesis including the implantable device.

BACKGROUND

Theoretically, a visual sense may be generated when an electric stimulus is applied at any location on the visual pathway between the retina and the visual cortex of the brain. According to the position where a stimulation electrode array is implanted, visual prostheses may be classified into retina-based prostheses, optic nerve-based prostheses or cortex-based prostheses. In other words, by applying a stimulation onto the retina, the optic nerve or the visual cortex of the brain with an electrode, a normal visual sense may be recovered.

However, no matter where a visual prosthesis is implanted, the implanted prosthesis has to face complicated environments inside the body and has to be subject to long-term corrosion by the corrosive body fluid. In addition, the implanted prosthesis must have excellent biological compatibility to satisfy the requirement for safety in use.

Therefore, how to continually improve corrosion-resistivity, leakproofness and biological compatibility of the implantable device to improve their use life and reliability, becomes a problem that is confronted and to be solved by those skilled in the art in the field of implantable medical device such as a visual prosthesis.

SUMMARY

The present disclosure aims to solve at least one of the technical problems in the prior art. To this end, one aspect of the present disclosure provides an implantable device.

The present disclosure further provides an encapsulating method for the above implantable device.

In addition, the present disclosure further provides a cerebral cortex stimulation-based visual prosthesis including the above implantable device.

According to an embodiment of a first aspect of the present disclosure, an implantable device is provided. The implantable device includes a flexible cable, a circuit chip, a fluid adhesion layer, and a vapor deposited layer. The flexible cable includes a lead-in part, a stimulation part and a connection part between the lead-in part and the stimulation part. The circuit chip is fixed to a surface of one side of the lead-in part and is electrically connected to the lead-in part. The fluid adhesion layer is adhered to an outer side of the circuit chip and an outer side of the lead-in part. The vapor deposited layer is directly deposited on an outer side of the fluid adhesion layer.

In the implantable device according to the embodiment of the present disclosure, the lead-in part fixed with the circuit chip is coated with the fluid adhesion layer and the vapor deposited layer, the fluid adhesion layer is adhered in a form of liquid molecules, and the vapor deposited layer is directly deposited in the molecular scale on the gaps and the surface of the assembly in which the fluid adhesion layer is adhered. In this way, the insulation characteristic of the fluid adhesion layer will not affect the electrical connection between the lead-in part of the flexible cable and the circuit chip and can significantly prevent the corrosive body fluid from permeating into the flexible cable and the circuit chip, guaranteeing the leakproofness, the use life and operational reliability of the implantable device.

According to some embodiments of the present disclosure, the implantable device further includes a coil and a coil holder that are encapsulated within the fluid adhesion layer. The coil holder supports the coil. The coil is configured to transfer energy and/or data and is electrically connected to the lead-in part and the circuit chip.

According to some embodiments of the present disclosure, the coil includes at least a first coil configured to transfer energy and a second coil configured to transfer data. The coil holder includes at least a first coil holder on which the first coil, the lead-in part and the circuit chip are supported, and a second coil holder positioned above the first coil holder. The second coil is supported on the second coil holder.

According to some embodiments of the present disclosure, the implantable device further includes a discrete element and/or a barrier layer. The discrete element is electrically connected to the lead-in part and the circuit chip, and is encapsulated within the fluid adhesion layer together with the lead-in part and the circuit chip. The barrier layer is provided on a surface of one side of the lead-in part that is facing away from the circuit chip, and is encapsulated within the fluid adhesion layer.

According to some embodiments of the present disclosure, the barrier layer includes a plurality of sub-barriers that are separately arranged, and the plurality of sub-barriers are configured to make the lead-in part into a general arch shape altogether.

According to some embodiments of the present disclosure, the barrier layer is made with low water vapor permeability.

The barrier layer can not only provide support for the flexible cable and the circuit chip, but also prevent corrosive body fluid from permeating into the flexible cable and the circuit chip to guarantee the use life and the operation reliability of the implantable device.

According to some embodiments of the present disclosure, the connection part is coated with a first encapsulating layer at its outer side, an end of the lead-in part is located at a start reference line, the first encapsulating layer starts from a first boundary line, the vapor deposited layer ends at a second boundary line, a distance between the first boundary line and the start reference line is L1, and a distance between the second boundary line and the start reference line is L2, where L2>L1.

According to some embodiments of the present disclosure, the vapor deposited layer is coated with a second encapsulating layer at its outer side, the second encapsulating layer ends at a third boundary line, and a distance between the third boundary line and the start reference line is L3, where L3>L2.

According to some embodiments of the present disclosure, the fluid adhesion layer ends at a fourth boundary line, a distance between the fourth boundary line and the start reference line is L4, and L2 and L4 satisfy L2>L4.

According to some embodiments of the present disclosure, positions of the first boundary line X1, the second boundary line X2, the third boundary line X3 and the fourth boundary line X4 satisfy a relationship of L3>L2>L1>L4.

According to some embodiments of the present disclosure, the implantable device further includes a conductive housing and an electrical connection part. The conductive housing covers an outer side of an assembly including the lead-in part and the circuit chip that are encapsulated. The electrical connection part is provided on a portion of the lead-in part that is located above the fourth boundary line X4, and the electrical connection part is connected with the conductive housing.

According to some embodiments of the present disclosure, the first encapsulating layer has a thickness in a range of 30 μm to 100 μm, and the second encapsulating layer has a thickness in a range of 100 μm to 1000 μm.

According to some embodiments of the present disclosure, the barrier layer includes a plurality of sub-barriers that are separately arranged, and a predetermined angle is formed between each two of the plurality of sub-barriers.

According to some embodiments of the present disclosure, the flexible cable further includes a tip to be clamped. The tip to be clamped is connected at an end of the stimulation part that is away from the connection part, the tip to be clamped has a width smaller than that of the stimulation part, and the tip to be clamped is provided at an angle with respect to the stimulation part.

According to some embodiments of the present disclosure, the fluid adhesion layer is made from silicone oil or its derivatives.

According to some embodiments of the present disclosure, the vapor deposited layer is a protection layer made of parylene.

According to some embodiments of the present disclosure, the flexible cable further includes a tip to be clamped. The tip to be clamped is connected at an end of the stimulation part that is away from the connection part, and the tip to be clamped is coated with a third encapsulating layer.

According to an embodiment of a second aspect of the present disclosure, a cerebral cortex stimulation-based visual prosthesis is provided. The cerebral cortex stimulation-based visual prosthesis includes the implantable device according to any of the embodiments of the first aspect of the present disclosure and an external device. The implantable device is configured to be implanted into a brain, and the stimulation part is configured to generate a stimulus on a visual cortex. The external device includes a camera unit, a video processing unit and a wireless signal generator. The camera unit is electrically connected to the video processing unit, the video processing unit is electrically connected to the wireless signal generator, and the wireless signal generator is electrically connected to the implantable device.

According to an embodiment of a third aspect of the present disclosure, an encapsulating method for an implantable device is provided. The encapsulating method is used for encapsulating a flexible cable and a circuit chip. The flexible cable includes a lead-in part, a stimulation part and a connection part between the lead-in part and the stimulation part. The encapsulating method includes the following steps:

S10, fixing the circuit chip onto a surface of one side of the lead-in part, and electrically connecting the circuit chip to the lead-in part;

S20, adhering hydrophobic adhesive fluid onto an assembly including the circuit chip and the lead-in part which is obtained in step S10, to obtain a fluid adhesive layer adhered to an outer side of the circuit chip and an outer side of the lead-in part; and S30, depositing a gas-phase material onto an assembly obtained in step S20, to form a vapor deposited layer on an outer side of the fluid adhesion layer.

According to some embodiments of the present disclosure, the step S20 further includes the following steps:

S201, clamping the connection part and dipping the assembly including the circuit chip and the lead-in part into a hydrophobic adhesive fluid to obtain the fluid adhesion layer; or S202, dripping the hydrophobic adhesive fluid onto the assembly including the circuit chip and the lead-in part using a dropper or a liquid injection device, and coating the assembly with the hydrophobic adhesive fluid to obtain the fluid adhesion layer.

According to some embodiments of the present disclosure, the encapsulating method further includes the following step between steps S10 and S20:

S11, providing a coil holder and a coil configured to transfer energy and/or data, supporting the coil with the coil holder, and electrically connecting the coil to the lead-in part and the circuit chip.

According to some embodiments of the present disclosure, the coil includes a first coil configured to transfer energy and a second coil configured to transfer data. The coil holder includes a first coil holder and a second coil holder.

The step S11 further includes:

providing the first coil, the lead-in part and the circuit chip onto the first coil holder; and providing the second coil holder above the first coil holder and providing the second coil on the second coil holder.

According to some embodiments of the present disclosure, the encapsulating method further includes the following steps between steps S10 and S20:

S13, connecting a discrete element onto the lead-in part; and/or

S15, providing a barrier layer on a surface of one side of the lead-in part that is facing away from the circuit chip, the barrier layer being made from a material with low water vapor permeability.

According to some embodiments of the present disclosure, the encapsulating method further includes the following step:

S40, coating the connection part with a first encapsulating layer at its outer side, wherein in a direction from a start reference line where an end of the lead-in part is located to the connection part, the first encapsulating layer starts from a first boundary line, the vapor deposited layer ends at a second boundary line, a distance between the first boundary line and the start reference line is L1, and a distance between the second boundary line and the start reference line is L2, where L2>L1.

According to some embodiments of the present disclosure, the encapsulating method further includes the following step: coating the vapor deposited layer with a second encapsulating layer at its outer side. The second encapsulating layer ends at a third boundary line, the fluid adhesion layer ends at a fourth boundary line, a distance between the third boundary line and the start reference line is L3, and a distance between the fourth boundary line and the start reference line is L4, where L3>L2 and L2>L4.

According to some embodiments of the present disclosure, the flexible cable further includes an tip to be clamped. The tip to be clamped is connected at an end of the stimulation part that is away from the connection part, and the encapsulating method further includes:

S60, coating the tip to be clamped with a third encapsulating layer.

According to some embodiments of the present disclosure, the step of coating the connection part with the first encapsulating layer is performed before the steps of adhering the fluid adhesion layer and depositing the vapor deposited layer.

The encapsulating method for the implantable device according to any of the embodiments of the present disclosure is easy to operate, and the produced implantable device has high strength and good leakproofness.

Additional aspects and advantages of the present disclosure will be given at least in part in the following description, or partially become apparent from the following description, or can be learned from practice of the present disclosure.

BRIEF DESCRIPTION OF DRAWINGS

The above and/or additional aspects and advantages of the present disclosure will become clear and easy to understand from the description of the embodiments below in conjunction with the accompanying drawings, in which.

DETAILED DESCRIPTION OF EMBODIMENTS

Figure 1:
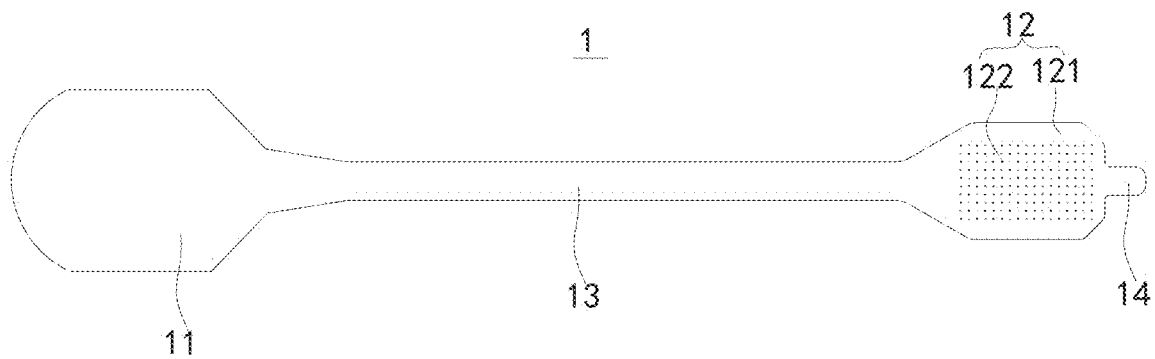
FIG. 1 is a schematic diagram illustrating a flexible cable of an implantable device according to an embodiment of the present disclosure.

The embodiments of the present disclosure will be described in detail below, the embodiments described with reference to the drawings are exemplary, and the detailed description of the embodiments of the present disclosure will be given below.

An implantable device according to embodiments of the present disclosure will be described below with reference to FIG. 1 to FIG. 10. The implantable device may be applied in a medical device which can be implanted into the human body, such as an artificial cochlea implant, a retina implant, a spinal-cord stimulator (for pain treatment), a brain stimulator or the like. In the following description of the present disclosure, an implantable device for a cerebral cortex stimulation-based visual prosthesis and a retina implant is mainly described as an example for illustration.

An implantable device 100 according to some embodiments of the present disclosure includes a flexible cable 1, a circuit chip 2, a fluid adhesion layer 3 and a vapor deposited layer 4.

As illustrated in FIG. 1, the flexible cable 1 includes a lead-in part 11, a stimulation part 12 and a connection part 13 between the lead-in part 11 and the stimulation part 12.

The stimulation part 12 may include a flexible substrate 121 and a plurality of stimulation electrodes 122 provided on the flexible substrate 121. The flexible substrate 121 may support and protect the plurality of stimulation electrodes 122. An end of each of the plurality of stimulation electrodes 122 is exposed from one surface of one side of the flexible substrate 121, so as to be adaptive to generate a stimulus on a human body part where the implantable device is to be implanted (for example, the retina or the cerebral cortex). Here, it needs to be illustrated that, the term "exposed" may mean that each of the ends of the plurality of stimulation electrodes 122 can be seen from the one side of the flexible substrate 121, and in this case, each of the ends of the plurality of stimulation electrodes 122 may protrude from the surface of the one side of the flexible substrate 121, or may be flush with the surface of the one side of the flexible substrate 121, or may sink below the surface of the one side of the flexible substrate 121. In the description of the present disclosure, "a plurality of" means two or more. For example, the number of the plurality of stimulation electrodes 122 may be sixty. Of course, more stimulation electrodes 122 may be arranged according to a different requirement, for example, hundreds of stimulation electrodes 122 may be arranged. In some embodiments of the present disclosure, the plurality of stimulation electrodes 122 may be provided on the flexible substrate 121 in a form of array (e.g., in rows and columns).

The connection part 13 may be provided therein with a plurality of conductive wires (not illustrated in the drawings) connected with the plurality of stimulation electrodes respectively. The plurality of conductive wires may be formed in one layer in the height direction, or several layers in the height direction. In this way, each stimulation electrode 122 may be driven separately, and the body part to be stimulated (such as the retina or the cerebral cortex) may be stimulated electrically in a targeted way. Optionally, each of the plurality of conductive wires (not illustrated in the drawings) in the connection part 13 may be preferably made from Au, Ag, Pt, Pd, Ti, Ir or alloy made from any combination thereof. Each of the plurality of stimulation electrode 122 may be preferably made from Pt, Ir or alloy made from any combination thereof.

In some embodiments of the present disclosure, the flexible cable 1 as a whole includes a first film layer, a metal layer and a second film layer, to form a sandwich structure of film-metal-film. The flexible cable 1 as a whole is manufactured through an MEMS processing technology (Micro-Electro-Mechanical System processing technology, which is a generic term of a micro-structure processing technology ranging from a nanometre scale to a millimetre scale) and may be manufactured through a chemical vapor deposition, spraying, electroplating, evaporation, plasma etching, patterning or any combination thereof.

In some optional embodiments, the flexible substrate 121 may be preferably made from poly(methyl methacrylate) (PMMA), Teflon (polytetrafluoroethylene), silicone, polyimide, polyethylene terephthalate, or Parylene(poly-p-xylylene, especially Parylene-C). By providing the flexible substrate 121 made of the flexible material, possible damage to the implanting position such as the cerebral cortex and eye tissue, caused by the stimulation part 12 during the implanting process, can be inhibited. The flexible substrate 121 may be preferably made from Parylene, and enable the stimulation part 12 of the flexible cable 1 to have a thickness of 10 µm-50 µm. In this way, it allows the stimulation part 12 to have a better plasticity to be adapted to the human tissue by being bent into an adaptive shape, so as to provide a better stimulation effect.

Figure 2:
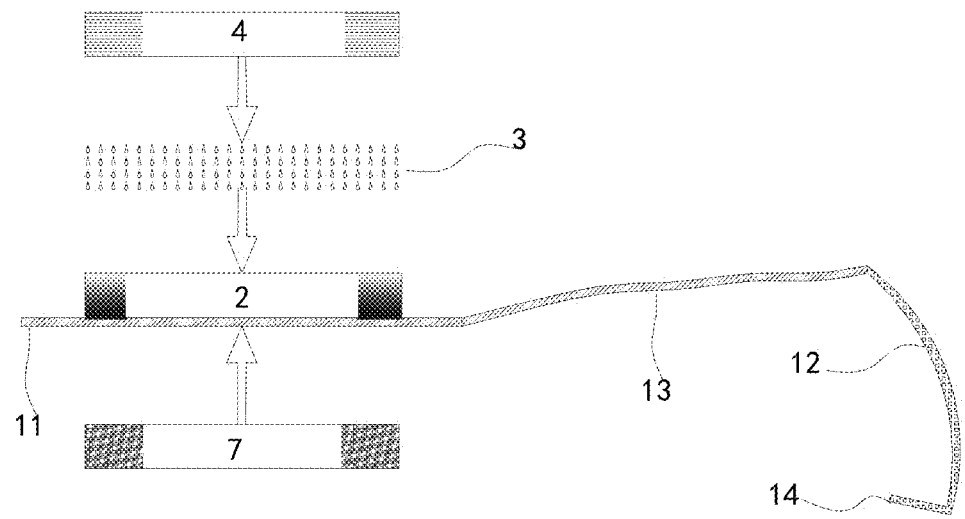
FIG. 2 is a schematic diagram illustrating an encapsulating process of an implantable device according to an embodiment of the present disclosure.

The circuit chip 2 may be for example an Application Specific Integrated Circuit (ASIC) chip configured to process a received data signal and to transmit an electric stimulation pulse to drive the stimulation electrode 122. As illustrated in FIG. 2, the circuit chip 2 is fixed to a surface of one side of the lead-in part 11, and the circuit chip 2 is electrically connected to the lead-in part 11. The circuit chip 2 is electrically connected to the lead-in part 11 at a plurality of connection points that are corresponding to the plurality of conductive wires within the connection part 13 respectively. The circuit chip 2 may be a semiconductor chip formed on a silicon substrate through e.g., a Metal Oxide Semiconductor (MOS) process.

Figure 3:
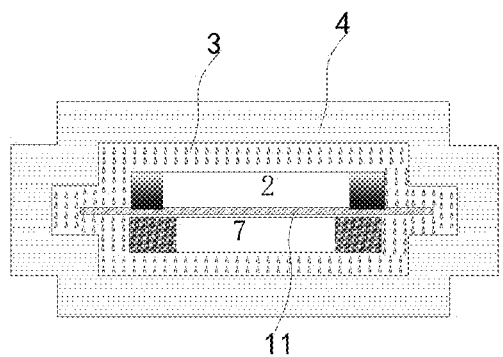
FIG. 3 is a schematic diagram illustrating the implantable device as illustrated in FIG. 2 after it is encapsulated.

As illustrated in FIG. 2 and FIG. 3, the circuit chip 2 and the lead-in part 11 are coated with the fluid adhesion layer 3 at the outer sides thereof. Here, the fluid adhesion layer 3 may be formed using hydrophobic, insulating and adhesive fluid, such as silicone oil or its derivatives. The silicone oil usually means linear polysiloxane, which is in a liquid form at room temperature, has good heat resistance, electric insulation, weather resistance, hydrophobicity, physiologic inertia, relatively small surface tension, relatively low viscosity-temperature coefficient, and relatively high resistance to compression. The fluid adhesion layer 3 may be formed by adhering the above hydrophobic, insulating and adhesive fluid onto the outer side of the circuit chip 2 and the outer side of the lead-in part 11 through dipping, brushing, spraying, dripping or the like. Since different fluids have different viscosities, a person skilled in the art may select different adhering processes. For example, for a fluid of a relatively high viscosity, the brushing method may be adopted. Optionally, the fluid adhesion layer 3 may have a thickness of 10 µm-100 µm.

Figure 11:
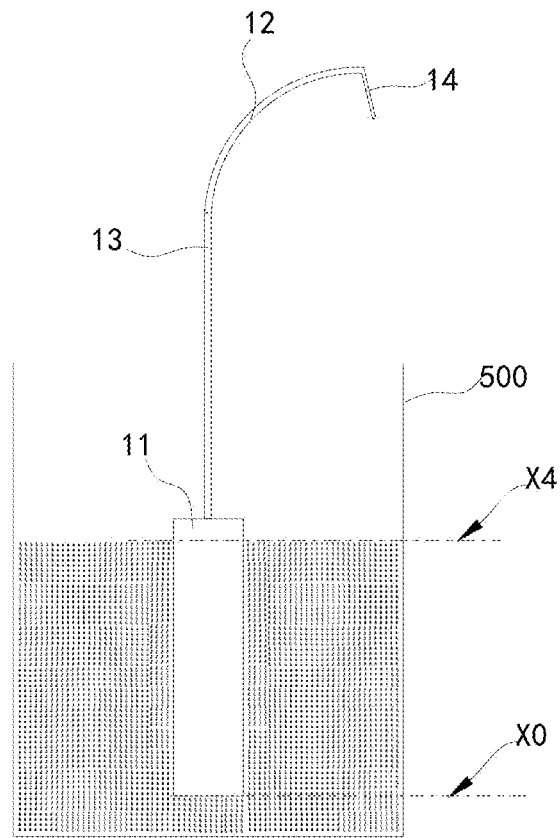
FIG. 11 is a schematic diagram illustrating a forming process of a fluid adhesion layer of an implantable device according to an embodiment of the present disclosure.

In an optional example of the present disclosure, the fluid adhesion layer 3 may be formed by dipping the lead-in part 11 and the circuit chip 2 into the silicone oil. In particular, as illustrated in FIG. 11, a certain amount of silicone oil is poured into a container 500 such as a beaker or a measuring container, an assembly including the lead-in part 11 and the circuit chip 2 which are fixed together is dipped into the silicone oil, and the assembly is fetched out from the silicone oil after a period of time. Since the silicone oil is adhesive, the assembly is adhered with a layer of silicone oil in a liquid form, and the silicone oil is adhered, in a molecular scale, into gaps and onto the surface of the assembly. In this way, the lead-in part 11 and the circuit chip 2 can be encapsulated with excellent leakproofness. When dipping the assembly into the silicone oil, the connection part 13 of the flexible cable 1 may be clamped with a tweezer or special clamping tool.

It shall be noted that, after the fluid adhesion layer 3 is formed on the lead-in part 11 fixed with the circuit chip 2, the hydrophobic, insulating and adhesive fluid such as silicone oil may still exist in a liquid fluid form so as to be adhered to the outer side of the circuit chip 2 and the outer side of the lead-in part 11 in a form of liquid molecules. In this way, it can significantly prevent corrosive body fluid from permeating into the flexible cable 1 and the circuit chip 2. It shall be noted that, before the fluid adhesion layer 3 is formed, other possible protection layer may be provided to further improve the leakproofness. For example, a protective layer (e.g., a Parylene layer formed by vapor deposition) may be formed on the outside of the circuit chip 2 and the lead-in part 11 and then the fluid adhesion layer 3 (e.g., a silicone oil layer) can be adhered to the outside of the protective layer. In this case, the fluid adhesion layer 3 is indirectly adhered to the outside of the circuit chip 1 and the lead-in part 11, which is also in the protection scope of this disclosure.

The vapor deposited layer 4 may be directly deposited on the outer side of the fluid adhesion layer 3, so as to encapsulate and fix the fluid adhesion layer 3 in a liquid fluid form. Here, the vapor deposited layer 4 may be optionally a protection layer of Parylene, which is formed by direct deposition of Parylene (poly-p-xylylene, especially Parylene-C). The protection layer of Parylene may be formed by depositing Parylene onto the assembly formed with the fluid adhesion layer 3 through a vapor deposition process. Since Parylene monomer has excellent permeability, the protection layer of Parylene can be deposited into the gaps and onto the surface at the outer side of the fluid adhesion layer 3, so as to form a nonporous and transparent insulation layer of a uniform thickness. In this way, a complete protection layer is deposited in a molecular scale and the leakproofness is guaranteed. Preferably, the vapor deposited layer 3 may have a thickness of 10 µm-30 µm.

Figure 12:
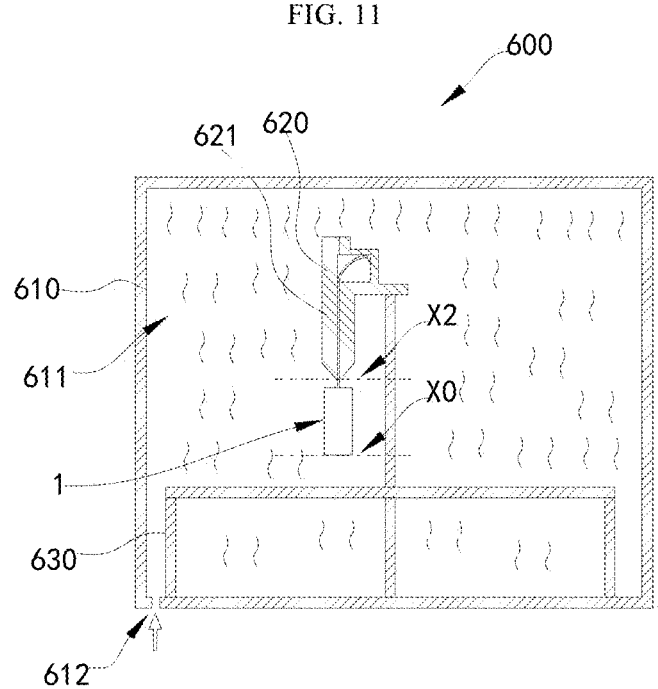
FIG. 12 is a schematic diagram illustrating a forming process of a vapor deposited layer of an implantable device according to an embodiment of the present disclosure.

In an optional example of the present disclosure, the protection layer of Parylene may be deposited using a vapor deposition device. The vapor deposition device may include a vaporization device (not illustrated in the drawings) and a deposition device 600 (as illustrated in FIG. 12). The processing in the vaporization device may include two stages as follows. In a first stage, Parylene in a powdered form is heated in vacuum and becomes to be in vapor state. And in a second stage, the vapor is supplied into an oven and is pyrolyzed into monomer (usually p-xylylene as monomer radical) at a preset temperature and then is supplied into the deposition device 600.

As illustrated in FIG. 12, the deposition device 600 includes a housing 610. The housing 610 contains a deposition chamber 611 therein, and the housing 610 is provided with a monomer inlet 612 at its bottom. The assembly formed with the fluid adhesion layer 3 is fixed in the deposition chamber 611 by a clamping device 620. The monomer formed after pyrolyzation enters the deposition chamber 611 from the monomer inlet 612, and is subject to a lowered temperature so as to be deposited onto the assembly formed with the fluid adhesion layer 3. In this way, the protection layer of Parylene is deposited. Optionally, the clamping device 620 may be a special clamping device including two supporting legs 621 as illustrated in FIG. 12. Firstly, the two supporting legs 621 are released, the connection part 13 and the stimulation part 12 of the flexible cable 1 are placed between the two supporting legs 621, and then the two supporting legs 621 are closed up to form a clamping space, so as to cover the connection part 13 and the stimulation part 12. In this way, after the deposition process, the connection part 13 and the stimulation part 12 which are covered by the clamping device 620 are not deposited with the Parylene layer, and the outer surface of the clamping device 620 and the lead-in part 11 formed with the fluid adhesion layer 3, which are exposed in the deposition chamber 611, are deposited with the Parylene layer. Thus, the unneeded part of the Parylene layer needs to be removed with a cutting tool or other tool, and the needed part of the Parylene layer is kept. Here, as illustrated in FIG. 12, at a position where the lower end of the clamping device 620 is located, the connection part 13 of the flexible cable 1 is formed with a second boundary line X2 indicating whether the vapor deposited layer 4 needs to be deposited. Of course, the present disclosure is not limited to this, and the clamping device 620 may be a tweezer or other tool. Further, optionally, the clamping device 620 may be fixed by a clamping device supporting frame 630 provided in the deposition chamber 611.

In the implantable device according to the embodiment of the present disclosure, the lead-in part 11 fixed with the circuit chip 2 is coated with the fluid adhesion layer 3 and the vapor deposited layer 4, the fluid adhesion layer 3 is adhered in a form of liquid molecules, and the vapor deposited layer 4 is deposited in the molecular scale into the gaps and onto the surface of the assembly in which the fluid adhesion layer 3 is adhered. The insulation characteristic of the fluid adhesion layer 3 will not affect the electrical connection between the lead-in part 11 of the flexible cable 1 and the circuit chip 2 and can significantly prevent the corrosive body fluid from permeating into the flexible cable 1 and the circuit chip 2, guaranteeing the leakproofness, the use life and operational reliability of the implantable device 100.

Figure 10:
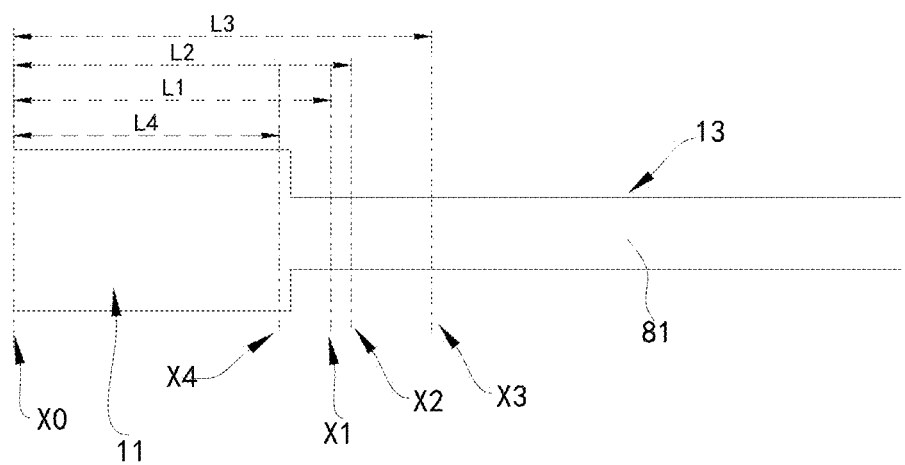
FIG. 10 is a schematic diagram illustrating encapsulating boundary lines for respective encapsulating layers in the implantable device according to the present disclosure.

As illustrated in FIG. 10, in some embodiments of the present disclosure, the connection part 13 is coated with a first encapsulating layer 81 at its outer side. The first encapsulating layer 81 can improve the strength of the connection part 13 and provide a sealing function. Optionally, the step of coating the connection part 13 with the first encapsulating layer 81 may be performed before the steps of adhering the fluid adhesion layer 2 and depositing the vapor deposited layer 4.

Figure 4:
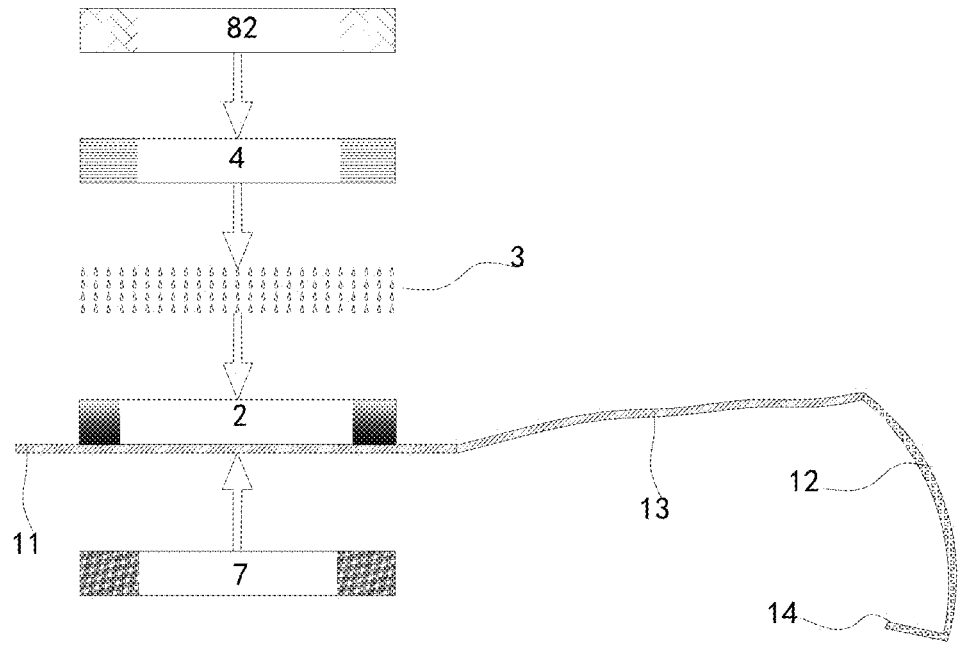
FIG. 4 is a schematic diagram illustrating an encapsulating process of an implantable device according to another embodiment of the present disclosure.
Figure 5:
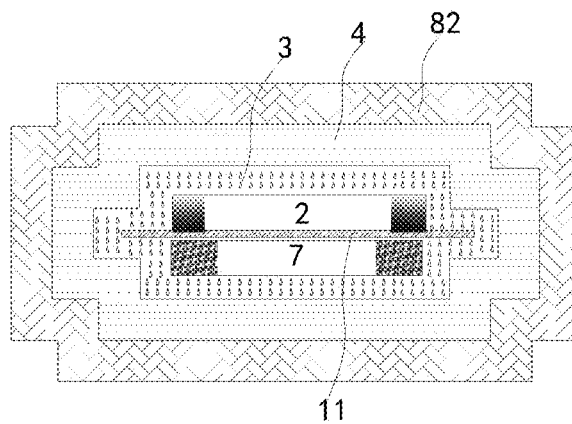
FIG. 5 is a schematic diagram illustrating the implantable device as illustrated in FIG. 4 after it is encapsulated.

In a further embodiment of the present disclosure, referring to FIG. 4-FIG. 5, the vapor deposited layer 4 may be coated with a second encapsulating layer 82 at its outer side to further improve the leakproofness of the encapsulated structure, so as to prevent permeation of the corrosive body fluid. Both the first encapsulating layer 81 and the second encapsulating layer 82 may be applied through injection molding. Optionally, each of the first encapsulating layer 81 and the second encapsulating layer 82 may be made from biological compatible silicone. Optionally, the first encapsulating layer 81 has a thickness of 30 µm-100 µm. Optionally, the second encapsulating layer 82 has a thickness of 100 µm-1000 µm.

The relative positional relations of the above layers will be described below with reference to FIG. 10.

As illustrated in FIG. 10, a start reference line X0 is defined at the position where an end of the lead-in part 11 is located, the first encapsulating layer 81 starts from a first boundary line X1, the vapor deposited layer 4 ends at a second boundary line X2 from the first reference line X0, the second encapsulating layer 82 ends at a third boundary line X3 from the first reference line X0, a distance between the first boundary line X1 and the start reference line X0 is L1, a distance between the second boundary line X2 and the start reference line X0 is L2, and a distance between the third boundary line X3 and the start reference line X0 is L3, where L2>L1 and L3>L2.

By providing L2>L1, an area between the first boundary line X1 and the second boundary line X2 is firstly coated with the first encapsulating layer 81 (for example, silicone layer). And then, the vapor deposited layer 4 (for example, Parylene layer) is deposited onto this area during the depositing process. The vapor deposited layer 4 is made of a material different from that of the first encapsulating layer 81 underneath the vapor deposited layer 4. In this way, it is easy to cutoff the vapor deposited layer 4 (for example, Parylene layer) in this area with a cutting tool, and the needed vapor deposited layer 4 can be kept.

Further, as illustrated in FIG. 10, by providing L3>L2, in the encapsulating process, the first encapsulating layer 81 (for example, a silicone layer) is firstly applied, and then a second encapsulating layer 82 (such as a silicone layer) is applied onto the outer side of the vapor deposited layer 4. Since the second encapsulating layer 82 is made of the same material as that of the first encapsulating layer 81 underneath the second encapsulating layer 82, in an area between the second boundary line X2 and the third boundary line X3, the second encapsulating layer 82 can be closely bonded with the first encapsulating layer 81, further improving the leakproofness.

Further, the fluid adhesion layer 3 (for example, the silicone oil layer) ends at a fourth boundary line X4, a distance between the fourth boundary line X4 and the start reference line X0 is L4, and L2 and L4 satisfy L2>L4. In other words, no insulating adhesive fluid is adhered in the area between X2 and X4. As illustrated in FIG. 11, for consideration of requirement for further circuit connection, an upper end of the lead-in part 11 when soaked in the silicone oil, i.e., the right end of the lead-in part 11 when laid flat, is above the liquid level of the silicone oil to avoid the upper end from being soaked in the silicone oil. Therefore, the fourth boundary line X4 is formed on the upper end of the lead-in part 11 to indicate whether the silicone oil needs to be adhered. In other words, in FIG. 11, a part of the lead-in part 11 that is below the fourth boundary line X4 is adhered with silicone oil to form the fluid adhesion layer 3, and a part of the lead-in part 11 that is above the fourth boundary line X4 is not adhered with the fluid adhesion layer 3. In this way, the vapor deposited layer 4 forms a complete sealing coating on the outer side of the fluid adhesion layer 3, so as to keep the shape of the fluid adhesion layer 3 and facilitate subsequent operations.

In some optional examples, the part of the lead-in part 11 that is located above the fourth boundary line X4 may be provided with an electrical connection part for further connection with an outside conductive housing (not illustrated in the drawings). As an example, the outside conductive housing may be made from metal and is sleeved on the outer side of the encapsulated assembly including the lead-in part 11 and the circuit chip 2 to form a structure adaptive to a retina prosthesis, simplifying the stimulation loop.

Of course, in some specific embodiments of the present disclosure, as illustrated in FIG. 10, the first boundary line X1, the second boundary line X2, the third boundary line X3 and the fourth boundary line X4 have a positional relation satisfying L3>L2>L1>L4. In this way, the flexible cable 1 has high leakproofness and high convenience for manufacture.

In a specific embodiment of the present disclosure, as illustrated in FIG. 1, the flexible cable 1 further includes a tip 14 to be clamped. The tip 14 to be clamped is connected at an end of the stimulation part 12 that is away from the connection part 13, and the tip 14 to be clamped is coated with a third encapsulating layer (not illustrated in the drawings) at its outer side. Optionally, the third encapsulating layer may be made of biological compatible silicone. Of course, the present disclosure is not limited to this. Each of the first encapsulating layer 81, the second encapsulating layer 82 and the third encapsulating layer may be made of polyimide, Parylene, epoxy adhesive or the like.

As illustrated in FIG. 1, the tip 14 to be clamped has a width smaller than that of the stimulation part 12. In this way, it is convenient to clamp the end 14 using a tweezer or another tool. For further improving convenience of being clamped, the tip 14 to be clamped may be provided at an angle with respect to the stimulation part 12. The angle is optionally a right angle of 90°.

Figure 6:
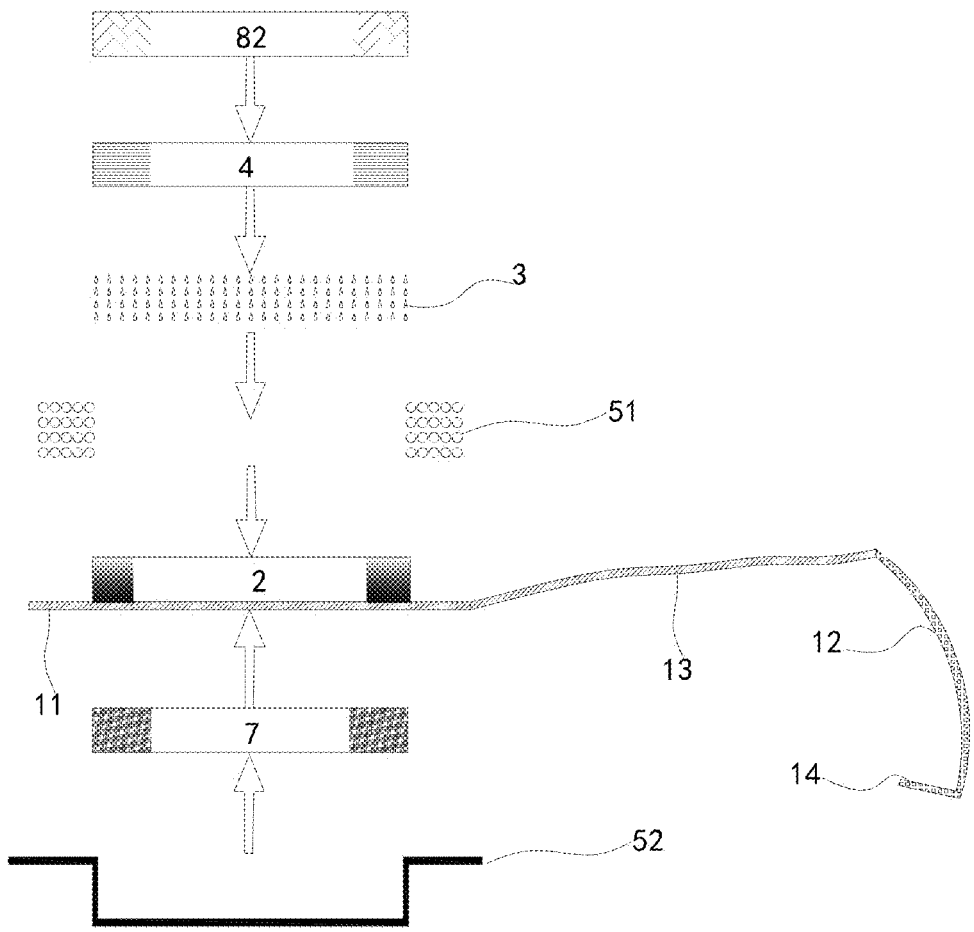
FIG. 6 is a schematic diagram illustrating an encapsulating process of an implantable device according to yet another embodiment of the present disclosure.
Figure 7:
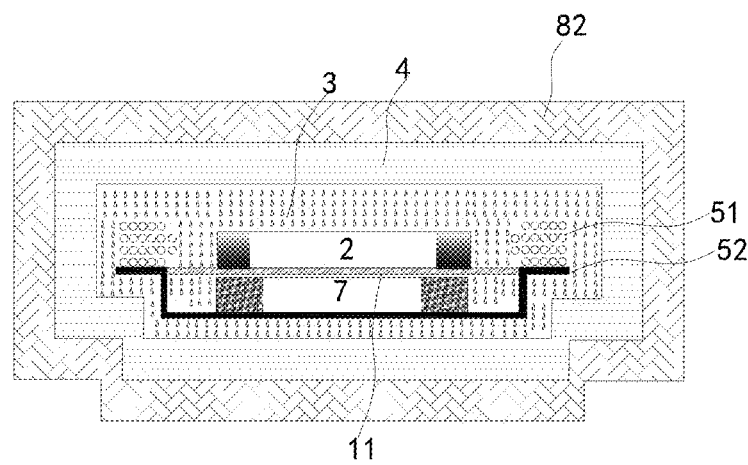
FIG. 7 is a schematic diagram illustrating the implantable device as illustrated in FIG. 6 after it is encapsulated.
Figure 13:
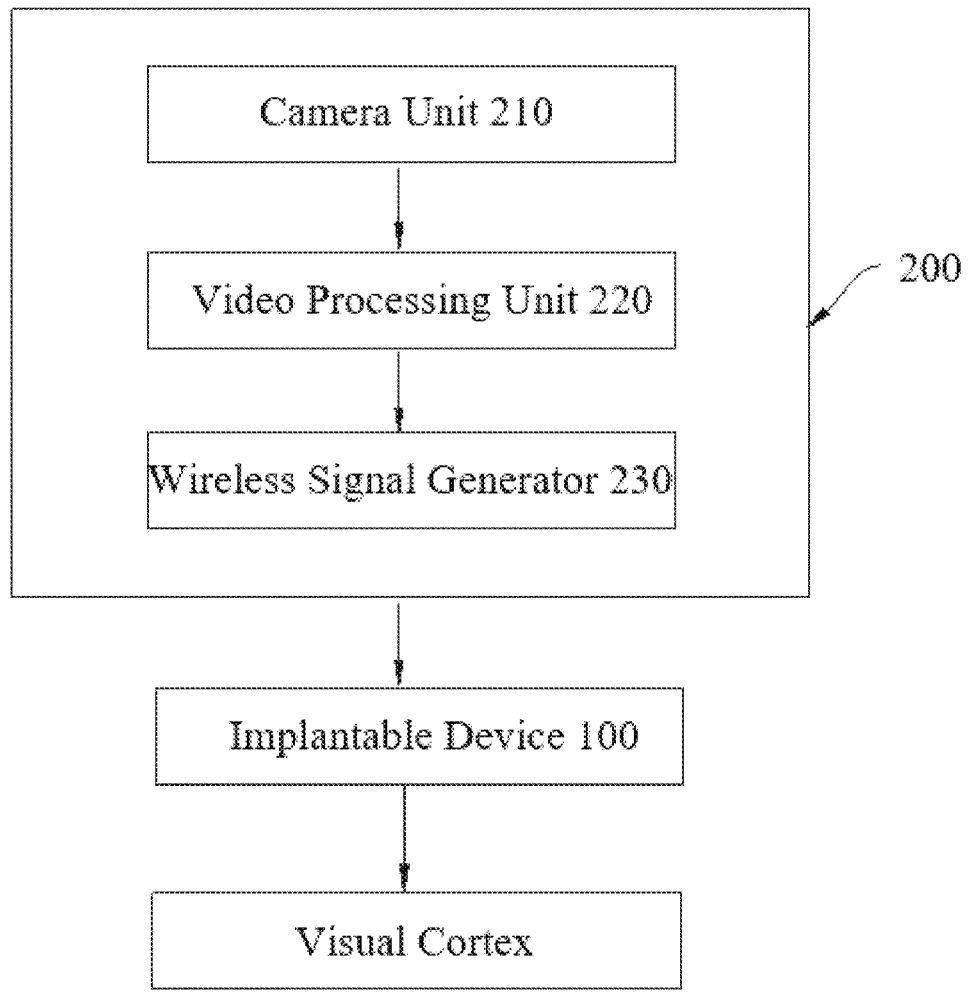
FIG. 13 is a schematic diagram illustrating the principle of a cerebral cortex stimulation-based visual prosthesis according to an embodiment of the present disclosure.

As illustrated in FIG. 6, FIG. 7 and FIG. 13, in some embodiments of the present disclosure, the implantable device 100 further includes a coil 51 and a coil holder 52 encapsulated inside the fluid adhesion layer 3. The coil 51 is configured to generate electromagnetic induction with a wireless signal generator (for example, a coil) of an outside device 200 to transfer energy and/or data. The coil 51 is electrically connected to the lead-in part 11 and the circuit chip 2. The coil 51 is supported by the coil holder 52. The coil 51 may include one or more coils.

Figure 8:
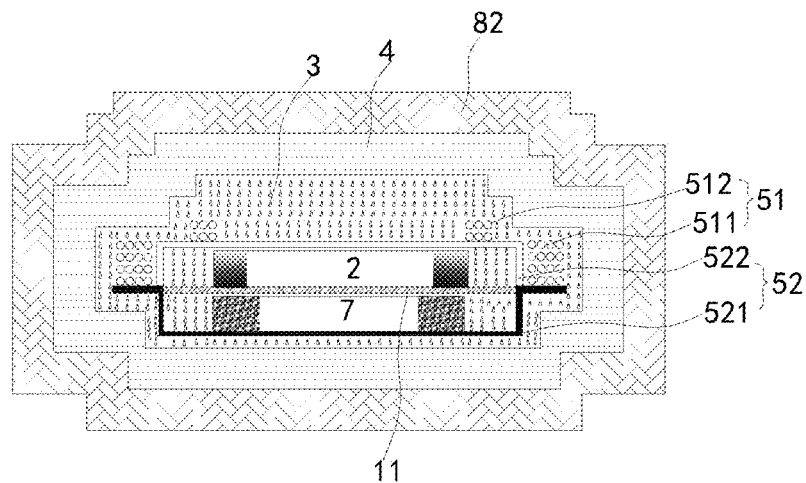
FIG. 8 is a schematic diagram illustrating an implantable device in an encapsulated state according to still another embodiment of the present disclosure.

In a specific embodiment of the present disclosure, the coil 51 includes two coils. As illustrated in FIG. 8, the coil 51 includes at least a first coil 511 configured to transfer energy and a second coil 512 configured to transfer data. Accordingly, the coil holder 52 includes at least a first coil holder 521 and a second coil holder 522 positioned above the first coil holder 521. In the example illustrated in FIG. 8, the first coil 511 has a radial size larger than that of the second coil 512. The first coil 511, the lead-in part 11 and the circuit chip 2 are all supported on the first coil holder 521. The second coil 512 is supported on the second coil holder 522.

Optionally, the first coil 511 and the second coil 512 may operate at different frequencies. In some examples, the first coil 511 operates at 100 KHZ to 200 KHZ to lower the power consumption and to reduce heat generation of the coil. The second coil 512 operates at a frequency higher than that of the first coil 511, preferably at 10 MHZ to 20 MHZ, to guarantee data integrity and reliability.

Further, since the coil 51 and the coil holder 52 need to be encapsulated inside the fluid adhesion layer 3, the coil holder 52, the lead-in part 11 and the coil 51 need to be fixed with each other through adhesive or other ways after the circuit chip 2 is fixed on the lead-in part 11 and before the hydrophobic insulating adhesive fluid is adhered, and then the assembly is encapsulated.

According to some embodiments of the present disclosure, as illustrated in FIG. 2-FIG. 8, the implantable device 100 further includes a barrier layer 7 encapsulated within the fluid adhesion layer 3. The barrier layer 7 is provided on a surface of one side of the lead-in part 11 that is facing away from the circuit chip 2. The barrier layer 7 needs to be fixed after the circuit chip 2 is fixed on the lead-in part 11. Optionally, the barrier layer 7 may be made of material having a low water vapor permeability, such as quartz glass, ceramic or metal. In some embodiments, the barrier layer 7 includes a plurality of sub-barriers that are separately arranged, and a predetermined angle may be formed between each two of the plurality of sub-barriers, to facilitate bending the lead-in part 11 of the flexible cable 1 into different shapes. In this way, the lead-in part 11 can be adapted to the morphology of the human tissue when the lead-in part 11 is implanted. In an optional example, the plurality of sub-barriers may be configured to make the lead-in part 11 into a general arch shape altogether, so as to make the lead-in part 11 be adapted to the outer surface of the human eyebulb.

Figure 9:
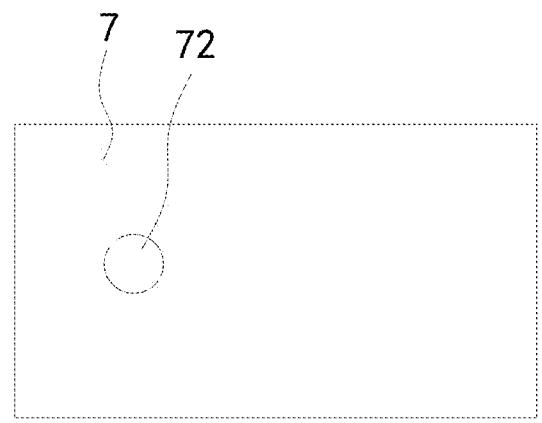
FIG. 9 is a schematic diagram illustrating a barrier layer in an implantable device according to an embodiment of the present disclosure.

In some embodiments, in order for the barrier layer 7 to be conveniently attached on the surface of the lead-in part 11, optionally, one barrier or a plurality of sub-barriers may be provided with an adhesive injection hole 72 (as illustrated in FIG. 9). A thin film of insulating adhesive is applied on a corresponding surface of the lead-in part 11, and then the one barrier or the plurality of sub-barriers is(are) aligned with and attached on the corresponding surface. After that, adhesive can be injected to the adhesive injection hole 72 to sufficiently fill the surface between the barrier layer 7 and the lead-in part 11 with the adhesive, and then heating and curing are performed.

The barrier layer 7 can not only provide support for the flexible cable 1 and the circuit chip 2, but also prevent corrosive body fluid from permeating into the flexible cable 1 and the circuit chip 2 to guarantee the use life and operation reliability of the implantable device 100.

According to some embodiments of the present disclosure, the implantable device 100 further includes a discrete element (not illustrated in the drawings) electrically connected with the lead-in part 11 and the circuit chip 2. The discrete element is encapsulated within the fluid adhesion layer 3 together with the lead-in part 11 and the circuit chip 2. Here, the discrete element may include a capacitor, an inductor, a resistor, an oscillator, a filter, a storage device or any electronic element which may be provided based on a circuit design.

In some optional examples, glue dispensing may be performed sequentially on two surfaces of the lead-in part 11, and then the discrete elements may be sequentially adhered through heating and curing. Of course, a person skilled in the art may understand that, if at least one discrete element exists, the at least one discrete element needs to be adhered and fixed first, and then the barrier layer 7 is fixed.

According to an embodiment of a second aspect of the present disclosure, an encapsulating method for the implantable device 100 is provided. The encapsulating method is used for encapsulating a flexible cable 1 and a circuit chip 2. The flexible cable 1 includes a lead-in part 11, a stimulation part 12 and a connection part 13 between the lead-in part 11 and the stimulation part 12. The encapsulating method includes the following steps:

S10, fixing the circuit chip 2 onto a surface of one side of the lead-in part 1, and electrically connecting the circuit chip 2 to the lead-in part 11;

S20, adhering hydrophobic adhesive fluid onto an assembly including the circuit chip 2 and the lead-in part 11 which is obtained in the preceding step, to obtain a fluid adhesive layer 3 adhered to an outer side of the circuit chip 2 and an outer side of the lead-in part 11; and S30, depositing a gas-phase material onto an assembly obtained in the preceding step, to form a vapor deposited layer 4 on an outer side of the fluid adhesion layer.

With the encapsulating method for the implantable device 100 according to the embodiment of the present disclosure, the lead-in part 11 fixed with the circuit chip 2 is coated with the fluid adhesion layer 3 and the vapor deposited layer 4, the insulation characteristic of the fluid adhesion layer 3 will not affect the electrical connection between the lead-in part 11 of the flexible cable 1 and the circuit chip 2 and can significantly prevent the corrosive body fluid from permeating into the flexible cable 1 and the circuit chip 2, guaranteeing the use life and operational reliability of the implantable device 100. The vapor deposited layer 4 is deposited in the molecular scale onto the gaps and the surface of the assembly in which the fluid adhesion layer 3 is adhered, so as to further guarantee the leakproofness of the implantable device 100.

The fluid adhesion layer 3 mentioned in the step S20 may be made of a hydrophobic, insulating and adhesive fluid. The fluid adhesion layer 3 may be formed by adhering the above hydrophobic, insulating and adhesive fluid onto the outer side of the circuit chip 2 and the outer side of the lead-in part 11 through dipping, brushing, spraying, dripping or other method.

In some embodiments of the present disclosure, the step S20 further includes the following steps:

S201, clamping the connection part 13 and dipping the assembly including the circuit chip 2 and the lead-in part 11 into a hydrophobic adhesive fluid, to obtain the fluid adhesion layer 3.

Of course, in some other embodiments of the present disclosure, the step S20 may adopt a following step S202, not the step S201, to obtain the fluid adhesion layer 3. The step S202 is:

S202, dripping the hydrophobic adhesive fluid onto the assembly including the circuit chip 2 and the lead-in part 11 using a dropper or a liquid injection device to obtain a fluid adhesion layer 3.

In an optional example of the present disclosure, the fluid adhesion layer 3 may be formed through being dipped with silicone oil. When being dipped, the connection part 13 of the flexible cable 1 may be clamped with a tweezer or special clamping tool.

According to some embodiments of the present disclosure, the encapsulating method further includes the following step:

S40, coating the connection part 13 with the first encapsulating layer 81 at its outer side, and coating the vapor deposited layer 4 with a second encapsulating layer 82 at its outer side.

Coating the connection part 13 with the first encapsulating layer 81 at its outer side may increase the strength of the connection part 13 of the flexible cable 1. In addition, coating the vapor deposited layer 4 with the second encapsulating layer 82 at its outer side may further increase the leakproofness of the encapsulated structure to prevent permeation of corrosive body fluid.

As illustrated in FIG. 10, in a direction from a start reference line X0 where an end of the lead-in part 11 is located to the connection part 13, the first encapsulating layer 81 starts from a first boundary line X1, the vapor deposited layer 4 ends at a second boundary line X2, the second encapsulating layer 82 ends at a third boundary line X3, a distance between the first boundary line X1 and the start reference line X0 is L1, a distance between the second boundary line X2 and the start reference line X0 is L2, and a distance between the third boundary line X3 and the start reference line X0 is L3, where L2>L1 and L3>L2. Further, the fluid adhesion layer 3 (for example, a silicone oil layer) ends at a fourth boundary line X4, a distance between the fourth boundary line X4 and the start reference line X0 is L4, and L4 and L2 satisfy L2>L4.

Of course, in some specific embodiments of the present disclosure, as illustrated in FIG. 10, positional relations of the first boundary line X1, the second boundary line X2, the third boundary line X3 and the fourth boundary line X4 satisfy L3>L2>L1>L4. In this way, the implantable device 10 has high leakproofness and high convenience for manufacture.

According to some specific embodiments of the present disclosure, as illustrated in FIG. 1, the flexible cable 1 further includes an tip 14 to be clamped. The tip 14 to be clamped is connected at an end of the stimulation part 12 that is away from the connection part 13. The encapsulating method further includes: S60, coating the tip 14 to be clamped with a third encapsulating layer at its outer side.

According to some embodiments of the present disclosure, as illustrated in FIG. 6 and FIG. 7, the encapsulating method further includes a following step S11 between the steps S10 and S20: S11, providing a coil holder 52 and a coil 51 configured to transfer energy and/or data, supporting the coil 51 with the coil holder 52, and electrically connecting the coil 51 to the lead-in part 11 and the circuit chip 2. Optionally, the coil 51 may include one or more coils.

According to some embodiments of the present disclosure, as illustrated in FIG. 2-FIG. 8, the encapsulating method further includes the following steps between steps S10 and S20:

S13, connecting a discrete element onto the lead-in part 11; and/or

S15, providing a barrier layer 7 on a surface of one side of the lead-in part 11 that is facing away from the circuit chip 2, the barrier layer 7 being made from a material with low water vapor permeability.

In some optional examples, in the step S13, glue dispensing may be performed on two surfaces of the lead-in part 11 respectively, and then the discrete elements may be sequentially adhered through heating and curing the adhesive. In the step S15, in particular, a thin film of insulating adhesive is applied on a corresponding surface of the lead-in part 11, and then one barrier or a plurality of sub-barriers is(are) aligned with and attached on the corresponding surface. After that, adhesive can be injected to the adhesive injection hole 72 to sufficiently fill the surface between the barrier layer 7 and the lead-in part 11 with the adhesive, and then heating and curing the adhesive is performed.

The encapsulating method for the implantable device according to embodiments of the present disclosure is easy to operate, and the produced implantable device has a high strength and a high leakproofness.

As illustrated in FIG. 13, according to an embodiment of the third aspect of the present disclosure, a cerebral cortex stimulation-based visual prosthesis is provided. The cerebral cortex stimulation-based visual prosthesis includes the implantable device 100 according to any of the above embodiments of the present disclosure and an external device 200. The implantable device 100 is configured to be implanted into a brain, and the stimulation part 12 is configured to generate a stimulus on the visual cortex.

The external device 200 includes a camera unit 210, a video processing unit 220 and a wireless signal generator 230. The camera unit 210 is electrically connected to the video processing unit 220. The video processing unit 220 is electrically connected to the wireless signal generator 230. The wireless signal generator 230 is electrically connected to the implantable device 100, for example, for wireless communication of data and energy with the coil 51 in the implantable device 100 through a coil (not illustrated in the drawings).

In particular, the camera unit 210 may be a camera. The camera unit 210 may be provided on a wearable device (for example, eye glasses). It needs to be illustrated that, the eye glasses may be replaced with other wearable devices such as a hat. The video processing unit 220 may be worn on another position of a patient, such as on the waist belt, belt on clothes or other positions, or may be placed in the pocket of the patient.

The camera unit 210 is electrically connected to the video processing unit 220. For example, the camera unit 210 may be connected to the video processing unit 220 via a cable. Optionally, the camera on an eye glass may transmit video information to the video processing unit 220, and the video processing unit 220 may convert the received video information into an electric pulse data signal. The video processing unit 220 may transmit the electric pulse data signal back to the eye glass through the cable, and the wireless signal generator 230 installed on the eye glass may transmit the data or energy back to the coil 51 in the implantable device 100.

The video processing unit 220 is electrically connected to the wireless signal generator 230. Optionally, the wireless signal generator 230 may include an external wireless data coil and an external wireless energy coil, or may include only one coil which transfers data and energy through the control by a software. The wireless signal generator 230 may extend from the eye glass towards the back side of the brain so as to be electrically connected with the coil inside the implantable device.

Figure 14:
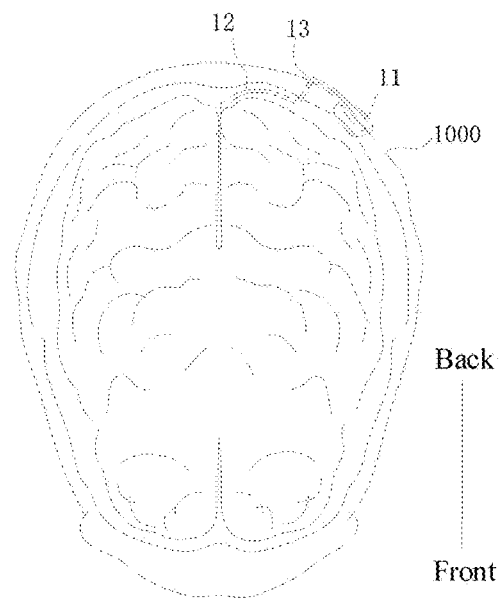
FIG. 14 and FIG. 15 are schematic diagrams illustrating the process in which the implantable device is implanted into the cerebral cortex according to the present disclosure.
Figure 15:
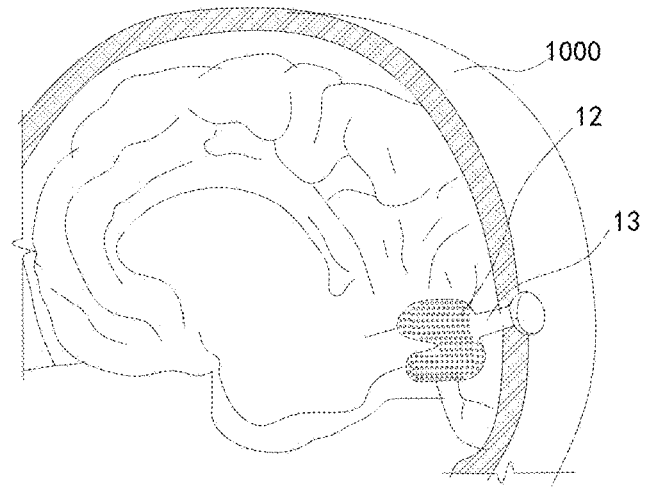

A process in which the implantable device 100 according to any of the embodiments of the present disclosure is implanted into the cerebral cortex 1000 will be described below with reference to FIG. 14 and FIG. 15.

An operator firstly removes a part of the skull to form a hollow-out part which is large enough to allow the stimulation part 12 to pass through. The operator clamps the tip 14 to be clamped of the flexible cable 1 with a tool (such as a tweezer, not illustrated in the drawings), implants the electrode array onto the surface of the cerebral cortex 1000, and implants the encapsulated structure including the circuit chip 2 and the lead-in part 11 into the hollow-out part of the skull, onto the skull or under the scalp. Generally, the stimulation part 12 having the stimulation electrode array may be implanted into the V1 area of the visual cortex in the brain, or may partially cover the V2 or V3 area. After the operation, the skull around the flexible cable 1 may be healed.

It shall be noted that, the V1, V2 and V3 areas in the visual cortex of brain are common areas classified in the cerebral field of the brain, and will not be further explained here. The stimulation part of the flexible cable 1 may be processed into a shape conforming to the grooves, wrinkles or uneven surfaces of the visual cortex area through molding and vacuum high-temperature molding, to realize a better stimulation effect.

Figure 16:
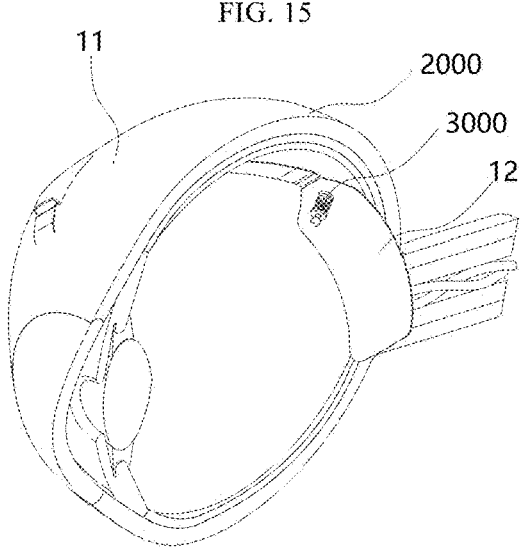
FIG. 16 is a schematic diagram illustrating the process in which the implantable device is implanted into the eyebulb according to the present disclosure.

A process in which the implantable device 100 according to any of the embodiments of the present disclosure is implanted into the eyebulb 2000 (that is, the implantable device is used as a retina implant) will be described below with reference to FIG. 16.

An operator clamps the tip 14 to be clamped of the flexible cable 1 with a tool (such as a tweezer, not illustrated in the drawings), and places the electrode array onto the surface of the retina. The doctor operates a screw holder (not illustrated in the drawings) to hold a fixing element 3000 (such as a micro-screw), and conveys the fixing element 3000 to the inside of the eyebulb 2000, and allows the fixing element 3000 to sequentially pass through the mounting hole (not illustrated in the drawings) on the stimulation part 12, the retina, the choroid and the sclera, so as to fix the stimulation part 12 onto the surface of the retina.

In the description of the present disclosure, the description with reference to the terms "one embodiment", "some embodiments", "exemplary embodiments", "example", "specific example", or "some examples", etc., means that specific features, structures, materials, or characteristics described in conjunction with the embodiment(s) or example(s) are included in at least one embodiment or example of the present disclosure. In the present disclosure, any illustrative reference of the above terms does not necessarily refer to the same embodiment(s) or example(s).

Although the embodiments of the present disclosure have been shown and described above, it can be appreciated by those of ordinary skill in the art that various changes, modifications, replacements and variants can be made to the above embodiments without departing from the principle and the spirit of the present disclosure. The scope of the disclosure is defined by claims and equivalents thereof.

The invention claimed is:

1. An implantable device, comprising:
   a flexible cable comprising a lead-in part, a stimulation part and a connection part between the lead-in part and the stimulation part;
   a circuit chip fixed to a surface of one side of the lead-in part and electrically connected to the lead-in part;
   a fluid adhesion layer adhered to an outer side of the circuit chip and an outer side of the lead-in part; and
   a vapor deposited layer directly deposited on an outer side of the fluid adhesion layer.

2. The implantable device according to claim 1, further comprising a coil and a coil holder that are encapsulated within the fluid adhesion layer, wherein the coil holder supports the coil, the coil is configured to transfer energy and/or data and is electrically connected to the lead-in part and the circuit chip.

3. The implantable device according to claim 1, further comprising:
   a discrete element electrically connected to the lead-in part and the circuit chip, wherein the discrete element is encapsulated within the fluid adhesion layer together with the lead-in part and the circuit chip; and/or
   a barrier layer provided on a surface of one side of the lead-in part that is facing away from the circuit chip, the barrier layer being encapsulated within the fluid adhesion layer.

4. The implantable device according to claim 1, wherein the connection part is coated with a first encapsulating layer at its outer side, an end of the lead-in part is located at a start reference line, the first encapsulating layer starts from a first boundary line, the vapor deposited layer ends at a second boundary line, a distance between the first boundary line and the start reference line is L1, and a distance between the second boundary line and the start reference line is L2, where L2>L1.

5. The implantable device according to claim 4, wherein the vapor deposited layer is coated with a second encapsulating layer at its outer side, the second encapsulating layer ends at a third boundary line, and a distance between the third boundary line and the start reference line is L3, where L3>L2.

6. The implantable device according to claim 5, wherein the fluid adhesion layer ends at a fourth boundary line, a distance between the fourth boundary line and the start reference line is L4, and L2 and L4 satisfy L2>L4.

7. The implantable device according to claim 6, wherein positions of the first boundary line, the second boundary line, the third boundary line and the fourth boundary line satisfy a relationship of L3>L2>L1>L4.

8. The implantable device according to claim 6, further comprising:
a conductive housing covering an outer side of an assembly comprising the lead-in part and the circuit chip that are encapsulated; and
an electrical connection part provided on a portion of the lead-in part that is located above the fourth boundary line, the electrical connection part being connected with the conductive housing.

9. The implantable device according to claim 5, wherein the first encapsulating layer has a thickness in a range of 30 μm to 100 μm, and the second encapsulating layer has a thickness in a range of 100 μm to 1000 μm.

10. The implantable device according to claim 3, wherein the barrier layer comprises a plurality of sub-barriers that are separately arranged, and a predetermined angle is formed between each two of the plurality of sub-barriers.

11. The implantable device according to claim 1, wherein the flexible cable further comprises a tip to be clamped, the tip to be clamped is connected at an end of the stimulation part that is away from the connection part, the tip to be clamped has a width smaller than that of the stimulation part, and the tip to be clamped is provided at an angle with respect to the stimulation part.

12. The implantable device according to claim 1, wherein the fluid adhesion layer is made from silicone oil or its derivatives.

13. The implantable device according to claim 1, wherein the vapor deposited layer is a protection layer made of parylene.

14. A cerebral cortex stimulation-based visual prosthesis, comprising:
the implantable device according to claim 1, wherein the implantable device is configured to be implanted into a brain, and the stimulation part is configured to generate a stimulus on a visual cortex; and
an external device comprising a camera unit, a video processing unit and a wireless signal generator, wherein the camera unit is electrically connected to the video processing unit, the video processing unit is electrically connected to the wireless signal generator, and the wireless signal generator is electrically connected to the implantable device.

* * * * *